US008170785B2

(12) United States Patent
Diekhans et al.

(10) Patent No.: US 8,170,785 B2
(45) Date of Patent: May 1, 2012

(54) METHOD FOR CREATING A ROUTE PLAN FOR AGRICULTURAL MACHINE SYSTEMS

(75) Inventors: Norbert Diekhans, Guetersloh (DE); Jochen Huster, Guetersloh (DE); Andreas Brunnert, Rietberg (DE); Lars-Peter Meyer Zu Helligen, Spenge (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 269 days.

(21) Appl. No.: 11/687,001

(22) Filed: Mar. 16, 2007

(65) Prior Publication Data
US 2007/0233374 A1 Oct. 4, 2007

(30) Foreign Application Priority Data
Mar. 30, 2006 (DE) .......................... 10 2006 015 204

(51) Int. Cl.
*G01C 21/30* (2006.01)
(52) U.S. Cl. .............. 701/209; 701/23; 701/25; 701/32; 701/33; 701/41; 455/11.1; 455/517; 455/575.9; 455/518; 455/207; 340/3.41; 340/3.1; 340/3.2; 340/825; 340/998; 172/5; 172/71; 172/102; 172/107; 172/134
(58) Field of Classification Search .............. 701/23, 701/25–26, 50, 200–202, 207–209; 340/988, 340/995.1, 995.12; 56/10.2 A; 180/167–169; 700/248; 455/11.1, 517, 575, 414, 518; 172/5, 172/71, 102, 107, 134, 145, 146, 147, 148
See application file for complete search history.

(56) References Cited

U.S. PATENT DOCUMENTS

| 5,646,844 | A | * | 7/1997 | Gudat et al. ................... 701/208 |
| 5,897,595 | A | * | 4/1999 | Hawkins et al. ................ 701/23 |
| 5,906,646 | A | * | 5/1999 | Kemner .......................... 701/23 |
| 5,931,875 | A | * | 8/1999 | Kemner et al. ................. 701/23 |
| 6,128,574 | A |   | 10/2000 | Diekhans |
| 6,205,381 | B1 | * | 3/2001 | Motz et al. ...................... 701/25 |
| 6,216,071 | B1 | * | 4/2001 | Motz ............................... 701/50 |
| 6,668,157 | B1 | * | 12/2003 | Takeda et al. ................. 455/11.1 |
| 6,741,921 | B2 | * | 5/2004 | Cohen et al. ..................... 701/50 |
| 6,799,100 | B2 | * | 9/2004 | Burns et al. ..................... 701/25 |
| 6,915,197 | B2 | * | 7/2005 | Van der Lely ................. 701/50 |
| 2005/0273253 | A1 |   | 12/2005 | Diekhans |
| 2007/0233374 | A1 | * | 10/2007 | Diekhans et al. ............. 701/209 |

FOREIGN PATENT DOCUMENTS

DE 10 2004 027 242 12/2005
EP 0 821 296 1/1998

* cited by examiner

*Primary Examiner* — Redhwan K Mawari
(74) *Attorney, Agent, or Firm* — Michael J. Striker (57) ABSTRACT

For creating a route plan for a group of agricultural working machine systems for working a territory, the machine systems include route planning data determination devices and they exchange data with each other and, based on exchanged route planning data, one shared route plan is created for the particular territory. For controlling a group of agricultural working machine systems while it works a territory, one shared route plan—which has been created accordingly—is used, and a route planning system is provided for creating a route plan for a group of agricultural working machine systems to be used to work a territory.

12 Claims, 6 Drawing Sheets

METHOD FOR CREATING A ROUTE PLAN FOR AGRICULTURAL MACHINE SYSTEMS

CROSS-REFERENCE TO A RELATED APPLICATION

The invention described and claimed hereinbelow is also described in German Patent Application DE 10 2006 015 2042 filed on Mar. 30, 2006. This German Patent Application, whose subject matter is incorporated here by reference, provides the basis for a claim of priority of invention under 35 U.S.C. 119(a)-(d).

BACKGROUND OF THE INVENTION

The present invention relates to a method for creating a route plan for a group of agricultural machine systems to use to work a territory.

The present invention also relates to a route planning system for creating a route plan, and a method for controlling a group of agricultural machine systems while they work a territory, using a shared route plan created accordingly.

Given that the performance of agricultural machine systems, i.e., working vehicles such as combine harvesters or forage harvesters, and tractors with various attachments such as showing machines, fertilizer spreaders, spraying devices, impellers, swathers, etc., has increased continually, the planning of the working sequence has also grown in significance in recent years. With harvesting in particular, the amount of time available to complete the work is usually limited, due to the weather, and this window of time is often not used in an optimal manner due to lack of resource planning. Precise resource planning is also important in order to attain the theoretically maximum possible performance of the machines in practical application.

To attain this goal of optimal resource utilization, route planning systems and route planning methods were developed, which are used to determine an optimized route for working the territory, e.g., a certain field, for the particular machine system. The particular machine system can then be driven along this route—depending on the configuration of the machine system—either fully automatically, semi-automatically, or simply manually. Route planning systems of this type and automatic steering systems typically function using satellite-based navigation devices, e.g., GPS receivers (GPS=Global Positioning System). Various correction procedures are used to improve accuracy, such as DGPS (differential GPS) for a GPS method.

A route planning system is described, e.g., in EP 0 821 296 A2. Using this system, the edge of the field is driven around with a GPS device, the coordinates of the field contour are recorded, and additional data specific to the working vehicle—the width, in particular—are entered. Using an electronic data processing device, a digitized working route is generated based on the driving route using a certain computation algorithm, and a certain optimization criterium for the working route is taken into account. Typical optimization criteria could be, e.g., that any auxiliary driving required, such as paths to be driven to turn around at the ends of the field or to refuel a combine harvester, etc., must be kept to a minimum. Another optimization criterium can be that the time required to work a certain field must be kept to a minimum, with the understanding that somewhat longer turn-around paths that can be traversed more quickly because they do not require a change in driving direction must be accommodated. Optimization can also be carried out with regard for several different optimization criteria in order to reach an optimal compromise between highly diverse optimization conditions.

In most cases, agricultural plots are worked by several machine systems. This means the field is worked by an entire group of agricultural machine systems that perform their work in succession as part of a process chain, as is the case, e.g., with a sowing machine and subsequent systems for applying sprayed substances and fertilizers, or that can operate in parallel, e.g., several harvesting machines that work together to harvest a large area. In principle, these various machine systems—provided they have corresponding route planning and automation systems—can each calculate their own ideal route, and then work it.

Before this can take place, however, every machine system must determine at least the outer contour of the territory to be worked, e.g., by driving around it once. This type of procedure takes a relatively great deal of time. It is indeed possible to use driving routes for other applications that were created previously in entirety by a route planning system for other applications, as described in EP 0 821 296 B1 and DE 10 2004 027 242 1. This is possible, however, only when the machine system is the same, or, at the least, when it is a machine system with the same or very similar working parameters, such as working width, turning radius, etc.

In addition, problems occur when several machines work on a territory—which is usually large—at the same time. When the routes are driven, the particular drivers must pay close attention to ensuring that they do not collide with other machine systems, because routes intersect, for example. Unnecessary waiting periods may ensue, in order to avoid collisions, or to wait for resources that are shared by the machine systems, e.g., when several combine harvesters must use the same unloading vehicle. In addition, with larger territories, a great detail of time is required to create the necessary reference lines, obtain further geographical route planning data, and to create a complete route plan.

SUMMARY OF THE INVENTION

The object of the present invention, therefore, is to provide an improved method for creating a route plan for a group of agricultural machine systems and a corresponding route planning system, with which the problems described above are prevented.

With the inventive method, the individual agricultural machine systems include their own route planning data determination devices, and they exchange data with each other. One shared route plan is then created based on the route planning data that are exchanged. The route planning data that are exchanged can be typical reference data, e.g., reference lines such as the field limits, path markings, obstacles, etc. They can also be their own (optimized) subroutes that have already been driven or that are planned, application data such as the type of application and crop data, e.g., crop properties and their consequences for the particular machine system, and machine parameters such as working width, turning radius, etc.

A route plan can be created for the entire territory very quickly and economically via the machine systems working together, in the manner according to the present invention. The shared route plan is then available for use by all participating machine systems and, preferably, by other machine systems as well.

To create an inventive route planning system for carrying out the inventive method, the various agricultural machine systems must include the following components:

Position determination devices, to determine the current position of the particular machine systems;

Route planning data determination devices, to provide the necessary route planning data, e.g., by automatically detecting the position data and additional information, and/or via input by an operator;

Communication devices, to transmit the route planning data.

At least one route planning device is also required, which is coupled with a receiving unit in order to receive route planning data, so that a shared route plan can be created for the particular territory based on the route planning data received.

The individual agricultural machine systems preferably each include their own route planning device and can receive and process the route planning data from other machine systems. The shared route plan can then be created based on the route planning data that were exchanged, in a manner that is coordinated by the route planning devices of the machine systems. To this end, each of the agricultural machine systems requires a coordination device that is coupled with the route planning device and acts on the route planning device in a manner such that a shared route plan is created based on the route planning data that were exchanged and in a manner that is coordinated with the route planning devices of other machine systems in the group of machine systems.

In principle, the individual machine systems can also first transmit all of their route planning data to a central route planning device, which then creates the shared route plan. The central route planning device can also preferably be a route planning device on one of the machine systems, which performs the route planning task, as a type of "master machine".

The inventive method for creating a shared route plan is preferably used as part of a method for controlling a group of agricultural machine systems while they work a territory. The shared route plan includes optimized routes for working the territory that are assigned to the individual machine systems. The machine systems can then be driven along the particular route in a known manner—either fully automatically, semi-automatically, or manually—which will be described in greater detail below.

In order to carry out a control method of this type, the route planning devices and the coordination devices of the agricultural machine systems coupled with it are preferably designed such that the shared route plan contains optimized routes for working the territory that are assigned to the individual machine systems. In addition, each of the individual machine systems preferably includes—in addition to the components described above—a driving control unit (automatic steering system) and/or a display unit for driving the machine system along a route, depending on whether the control takes place fully automatically, semi-automatically, or manually.

Due to the networking of the various route planning systems and the continual data exchange, it is possible to determine optimal routes specifically for the individual machine systems; the optimization strategy takes the routes of the other vehicles into account. This means that optimization is no longer based on a single vehicle, in an isolated manner. Instead, it takes the entire picture into account in an appropriate manner, particularly the previous or subsequent process steps or machine systems that are working the same territory in parallel. The entire working process can therefore be optimized. The risk of collision with vehicles working in parallel, or unnecessary waiting periods for shared resources and other vehicles can be effectively prevented.

For the communication between the machine systems, any type of bidirectional communication system can be used, along with the transmitters/receivers known therefore, i.e., radio-controlled systems in particular, as are used in radiotelephony. It is also possible, e.g., to use mobile radio communication networks or the like.

The inventive control system, the inventive agricultural machine systems, and the inventive control system can also be refined analogously to the features of the inventive method.

As described above, the route planning data preferably include geographical reference data, e.g., various reference lines that indicate the field edges or the positions of obstacles, etc. They are preferably determined automatically using the machine systems.

There are various methods for recording a reference line. In one variant, for example, the driver can set a start point using a user interface when he drives along a reference path, and he can set an end point when he has reached the end of the reference path. It is possible to simply draw a straight line between the start point and end point to form the reference path. This can be done, e.g., when a straight field edge is involved, or a line in the field, along which the field is to be subdivided into subregions. A "contour mode" is also realizable, in the case of which the position coordinates of the vehicle are detected and recorded at regular intervals between the start point and the end point of the reference path. The exact contour of the reference path that was traveled is therefore also detected and can be used as a reference line. As a further alternative, only one start point is assigned, then a certain length of the path is driven.

As described above, a reference line can be an individual path, e.g., just one edge of a field. A reference line can also be composed of several subpaths, however, and the individual subpaths can also be regarded as separate reference lines, of course.

It is basically possible for the first machine system and the second machine system to work the territory in chronological succession, i.e., for these to be machine systems in a process chain, such as a sowing machine and a field sprayer or a cutting machine, followed by impellers and swathers. Preferably, however, the method is also used when the first machine system and the second machine system work a territory in parallel, at least part of the time, as is the case, e.g., with a group of machines that work a large territory in parallel. The individual machine systems can also be similar machine systems, e.g., several combine harvesters or several forage harvesters—even of the same type.

Mainly, when several machines work a territory together, at the same time or partially at different times, the transfer of all information—the reference lines in particular—should take place dynamically during the entire working application. This means, as soon as one of the machine systems determines new reference data, they are transmitted immediately to the other machine systems. The transmission can take place automatically by the machine system and/or it can be triggered by the operator of the particular machine system. It is also possible, however, to prevent or delay the transmission or receipt of new reference data.

With the inventive method it is also advantageously possible for the machine systems to each drive along a portion of the required reference paths, particularly at the start of a parallel operation, and to transmit these data to each other, in order to thereby obtain all of the reference data required as quickly as possible. For example, a machine system could drive along the right edge and upper edge of the field, while another machine system simultaneously drives along the left edge and the lower edge of the field.

The territory to be worked and that is specified by the reference data can then be subdivided into subregions, e.g., based on the route planning data. This approach is suited, in particular, when several machine systems in a group work a territory at the same time, or when the shape of the field is highly irregular.

It is also possible, e.g., for the various machine systems to determine a separate subroute plan for a certain subregion of the territory to be worked. The advantage of this is that each of the route planning devices can optimize—relatively freely—the optimal route for the particular, machine system in "its" subregion, without regard for the other machine systems. A more exact coordination of the path planning is then required mainly only in the driving tracks where the subregions abut each other, in commonly used turnaround regions, and on paths from and to shared resources.

Particularly preferably, current geographical position data of the individual machine systems are determined repeatedly, i.e., continually or in time intervals, and then transmitted to the other machine systems. This is advantageous, in particular, when several machines work a field in parallel. All machine systems then know where they are located and where the other machine systems are located. Collisions can therefore be reliably avoided, e.g., by specifying safety margins and emergency shut-offs when the safety margin is exceeded.

With a particularly preferred refinement of the method, the route plan is changed dynamically when a new machine system joins the group or when a machine system leaves the group. This makes it possible to add a new machine system to the group at any time or to allow machine systems to leave the group at any time, e.g., due to a defect or because they are needed somewhere else. When a new machine system is added, it only needs to establish communication with the other machine systems and "announce" itself within the group. It does this by transmitting its available route planning data which, in the simplest case, are its own position data, its machine parameters, and information about the fact that this machine system is supposed to participate in this operation. It then receives the route planning data from the other machine systems, including the existing route plan. The machine systems can then change the shared route plan in a coordinated manner, in order to incorporate the new machine system in an optimal manner. The route plan can be changed in a similar manner when a machine system "signs off" from the group.

Particularly preferably, a shared map created based on the geographical reference data, the current position and the optimal route for the particular machine system, and the current positions of other machine systems in the group located in the territory to be worked are output to the operators of the machine systems using a display device. In this manner, all operators always have a complete overview of current events during the operation. Particularly preferably, the operators see displays of their own routes and the routes to be traveled by the other machine systems in the group that are located in the territory to be worked. This allows the users to perform another check to determine whether the routes are indeed optimal, based on their own estimation, or whether collisions or unnecessary waiting periods could occur at certain points due to faulty planning. In addition to the routes and positions, it is also possible to display information such as path markings, driving tracks that have already been worked, obstacles, blocked areas, etc.

Basically, the various machine systems can operate using different coordinate systems, and the transmitted coordinates are then converted. With a preferred variant, all machine systems operate using the same coordinate system with an exactly defined origin. A local coordinate system is preferably used, the origin of which—e.g., a corner of the territory to be worked—is defined in the form of coordinates of the satellite-based navigation system, e.g., as a GPS position with latitude degree, longitude degree, and elevation. This "zero point" is then identical for all machine systems.

As explained briefly above, the machine systems can be controlled fully automatically along the optimized route, provided the machine systems are equipped with appropriate driving control units, e.g., automatic steering systems. In a case such as this, it is also always possible, for safety reasons, for the operator to override the system, i.e., as soon as he actuates certain control devices such as the brake, steering wheel, clutch, etc., the automatic steering system is shut off. Semi-automatic control or manual control are also possible, in which case the driver is shown his route, on a display device, i.e., a certain driving track to stay on, and his current position and any further auxiliary displays, such as angular deviation, etc., with the aid of which the driver can manually hold the vehicle on the specified driving track.

Preferably, based on the route planning data of the various machine systems, it is also possible to define safety zones which are assigned to the various machine systems. In these safety zones, automatic control of the particular assigned machine systems can be limited, or, in particular, deactivated completely. Typical safety zones are regions near roads, or regions in areas where the position signals cannot be received clearly, due, e.g., to a thick woods being located nearby.

With a preferred variant of the present invention, a derived reference line is first determined, based on a reference line that was determined originally. For example, based on reference lines recorded originally that define the field edges, shifted reference lines can be created as virtual guide lines that define the driving tracks for the individual machine systems. Preferably, a fixed offset can be provided between the derived reference lines. To do this, it is only necessary to know the working width of the machines that will use the reference lines. This is advantageous, in particular, when several machines work the same field in parallel.

The derived reference lines can also be defined in order to specify driving paths for subsequent machine systems in a process chain. For example, preferably when a machine system is used for sowing, it is possible to create "spraying paths" and simultaneously generate suitable reference lines for these spraying paths, which are then made available to a subsequent field sprayer.

By using derived reference lines of this type to specify driving paths, it is also possible, in particular, for various operations within a process chain to be optimized such that the particular machine systems do not use exactly the same driving tracks, in order to thereby prevent excessive compression of the ground along the driving tracks.

With a preferred variant mentioned above, a certain working machine operates as the "master machine", and the other machine systems operate as the "client machines". Particularly preferably, this can also be established at any time by the operators of the machine systems or by an operator with special authorization. In a case such as this, the coordination and route planning are then preferably carried out by the route planning system of the "master machine". This "master machine" receives, e.g., the route planning data from the "client machines", and assigns subtasks—as part of the route planning—to the individual "client machines", in order to make optimal use of computing capacities. For example, this "master machine" could subdivide the field to be worked into subregions (beds) based on the route planning data received from the individual machine systems, i.e., particularly their position data, their machine parameters, and their determined reference data, and assign these subregions (beds) to the various "client machines".

The subdivision of the field into beds and their assignment to the individual "client machines" can take place with consideration for the machine parameters to the extent that, e.g., a larger bed is assigned to a more powerful machine, and a smaller bed is assigned to a machine with less power and a smaller working width. The individual "client machines" can then automatically plan their routes within their beds and send the planned routes to the "master machine". In the route planning device and/or coordination device in the "master machine", a check is then carried out to determine the extent to which the individual routes are well-coordinated with each other and whether they might intersect and cause problems. In particular, the "master machine" can also specify basic conditions for the "client machines" to comply with when they plan the routes in the beds, in order to thereby ensure optimal coordination and to prevent collisions and waiting periods.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
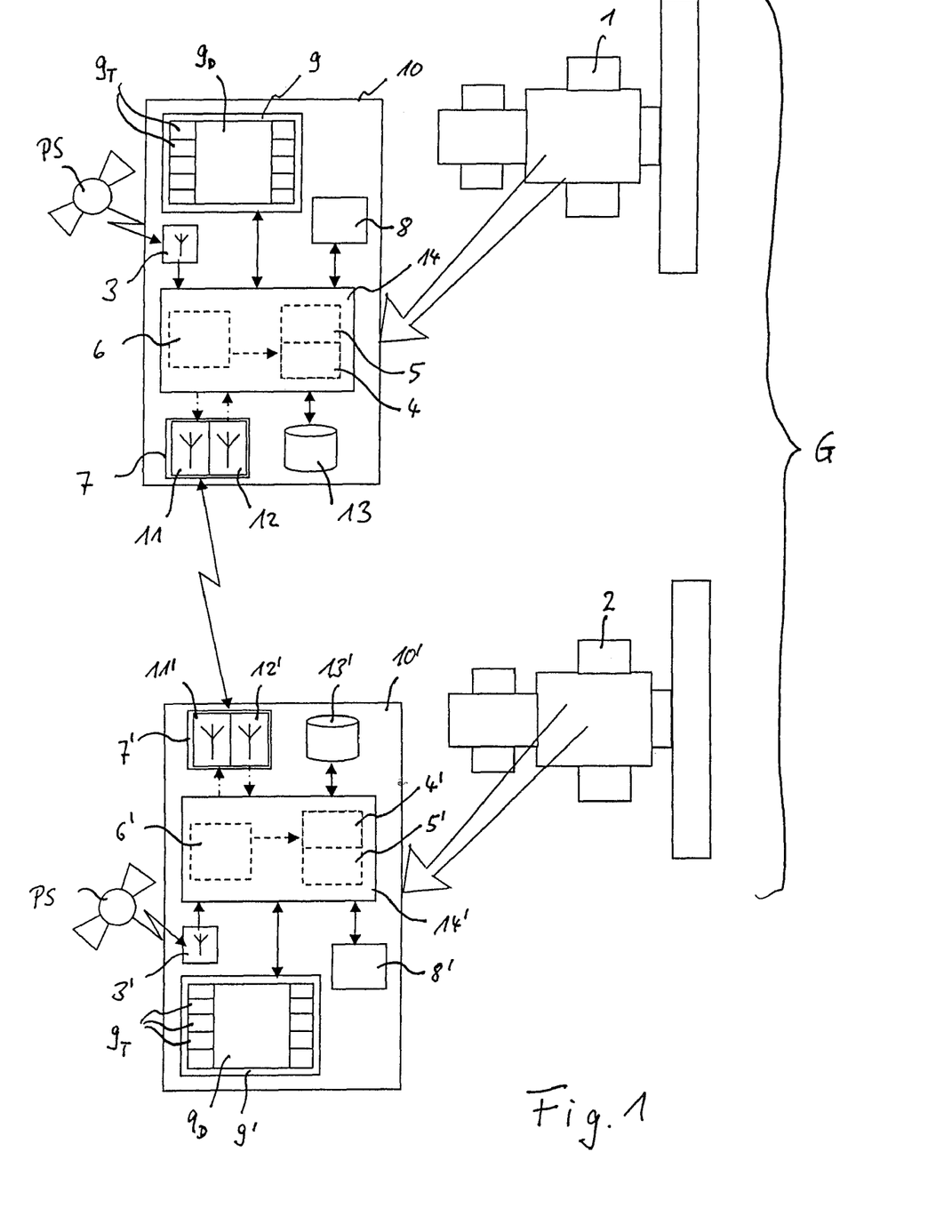
FIG. 1 is a schematic depiction of two machine systems with inventive control devices.

With the exemplary embodiment of the inventive control system shown in FIG. 1, only two identically configured machine systems 1, 2—two combine harvesters 1, 2 in this case—are shown, for simplicity. They can be used together in a group G of machines, for example, in order to work a large area in the shortest possible time.

The design and mode of operation of combine harvesters 1, 2 are basically known to one skilled in the art, as are suitable control systems for controlling combine harvesters 1, 2. In addition, suitable route planning systems are made known in EP 0 821 296 A1 and DE 10 2004 027 242 A2. Reference is hereby made to the entire contents of these publications. For this reason, only those components that are essential to the explanation of the present invention are shown in FIG. 1; combine harvesters 1, 2 are configured identically in terms of these components.

The essential components of control devices 10, 10' (which are also configured identically for both machine systems) include a position determination device 3, 3', e.g., a GPS receiver, which receives GPS signals from a suitable position satellite PS. This is preferably a GPS receiver that operates in a corrected, satellite-based system, e.g., with DGPS or the like, in order to determine position as exactly as possible, preferably to within a few centimeters.

Control devices 10, 10' also each include a route planning data determination device 6, 6'. With this route planning determination device 6, 6', it is possible to determine, e.g., any reference data, particularly reference lines. To this end, e.g., using position determination device 3, it is possible to determine the current position of combine harvester 1, 2 and, using appropriate recording means, it is possible to record the positions along a path that is driven, in order to thereby generate reference lines or reference points, as described above. In addition, information about the reference points can be input at a user interface 9, 9'.

With the control device 10, 10' shown, this user interface is composed of a display unit 9, 9' in the form of a touch display with a central display surface $9_D$, on which various information can be displayed to the user. Display unit 9, 9' also includes virtual buttons $9_T$ on the edge. Using said virtual buttons $9_T$, the operator can enter information into the system, e.g., additional information when reference data are generated. In particular, the operator can enter a start point and an end point for recording a reference line. It is also possible, as will be explained in greater detail below, for the planned route and various position data to be displayed to the operator in display unit 9.

Control devices 10, 10' also include a communication device 7, 7' with a transmitting unit 11, 11' and a receiving unit 12, 12', so that the various control devices 10, 10' of the combine harvester 1, 2 can communicate with each other and exchange route planning data in particular.

Control device 10, 10' also includes a route planning device 5, 5' and a coordinating device 4, 4.'

The route planning data are transmitted to route planning device 5, 5', which plans an optimal route based on these data. According to the present invention, the route planning data from all machine systems 1, 2 in a group G can be used, since they are exchanged via communication device 7. According to the present invention, coordinating device 4, 4' ensures that the procedure is coordinated, i.e., machine systems 1, 2 or their route planning devices 5, 5' generate a shared route plan which contains the optimized routes for individual machine systems 1, 2. It should be noted once more that the route planning data also include previously planned subroutes in route planning device 5, 5', so that all route planning devices 5, 5' are informed about the planning carried out by the other machine systems and can take this into account when coordinating the route planning.

Route planning determination device 6, 6', route planning device 5, 5', and coordinating device 4, 4' are preferably realized in the form of software modules in a central control processor 14, 14' of particular control devices 10, 10'.

Control devices 10, 10' also include a suitable memory device 13, 13'. In memory device 13, 13', suitable route planning data are stored and will be stored, particularly reference data, which includes data on the territory to be worked, e.g., field limits, crop data, etc., but also the machine parameters of the particular agricultural machine system itself, and those of the other machine systems in the group, if necessary.

With the exemplary embodiment shown in FIG. 1, control devices 10, 10' also include a driving control device 8, 8', i.e., an automatic steering system that is controlled by route planning device 5, 5', in order to thereby control particular combine harvester 1, 2 exactly along the optimized routes provided for combine harvesters 1, 2.

Various examples are explained below with reference to FIGS. 2 through 5 regarding how optimized route planning can be carried out in highly diverse situations by using inventive networked and/or coordinated route planning devices 5, 5' of various machine systems 1, 2 in group G.

Figure 2:
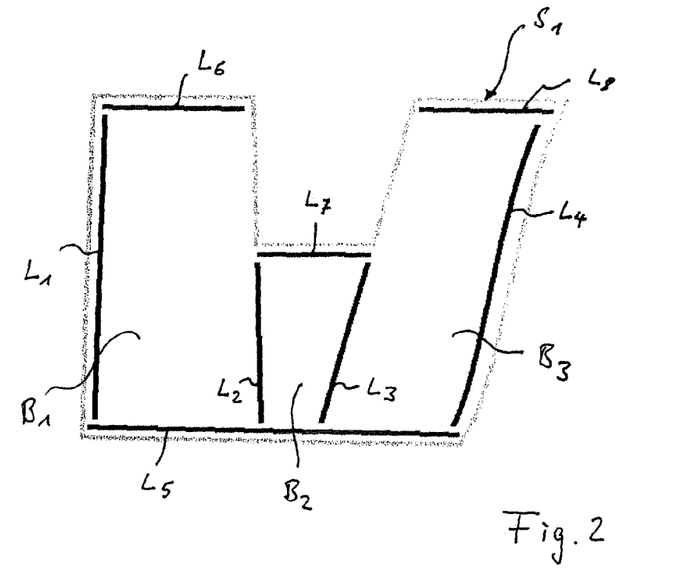
FIG. 2 shows a depiction of possible reference lines in a territory with polygonal outer contours.

FIG. 2 shows how separate surface areas, i.e., various beds $B_1$, $B_2$, $B_3$, on a field $S_1$ with polygonal outer edges can be determined by strategically recording certain reference lines $L_1$, $L_2$, $L_3$, $L_4$, $L_5$, $L_6$, $L_7$, $L_8$. For example, reference lines $L_1$, $L_4$, $L_5$, $L_6$, $L_7$, $L_8$ that define the outer edges of field $S_1$ can be driven along first. Further reference lines $L_2$, $L_3$ can serve to subdivide field $S_1$ into three beds $B_1$, $B_2$, $B_3$. These reference lines $L_1$ $L_2$, $L_3$, $L_4$, $L_5$, $L_6$, $L_7$, $L_8$ can be determined, e.g., during the sowing operation, by a first machine system such as a tractor with sowing devices and subsequently transmitted to further machine systems to be used later in the process chain. Based on these reference lines, the downstream machine systems can plan their own optimal routes. In particular, when working this field $S_1$ in parallel, various machine systems in a group can be assigned to individual beds $B_1$, $B_2$, $B_3$; the machine systems determine an optimal route for themselves based on the reference lines for this bed $B_1$, $B_2$, $B_3$ and then work particular bed $B_1$, $B_2$, $B_3$ along the optimal route.

Special attention should be paid to route planning in terms of a coordinated sequence of steps, particularly in the boundary regions and turnaround regions, i.e., a total route plan is preferably created, in which the particular routes for individual beds $B_1$, $B_2$, $B_3$ are integrated in a manner such that optimization is carried out with regard for the entire operation (and not solely with regard for individual beds $B_1$, $B_2$, $B_3$). If reference lines $L_1$, $L_2$, $L_3$, $L_4$, $L_5$, $L_6$, $L_7$, $L_8$ do not have to be determined until a group of machines working in parallel is employed, the individual machine systems can also each preferably determine a portion of these reference lines $L_1$, $L_2$, $L_3$, $L_4$, $L_5$, $L_6$, $L_7$, $L_8$ and exchange them with each other, so that all reference data required to plan the route are obtained as quickly as possible.

Figure 3:
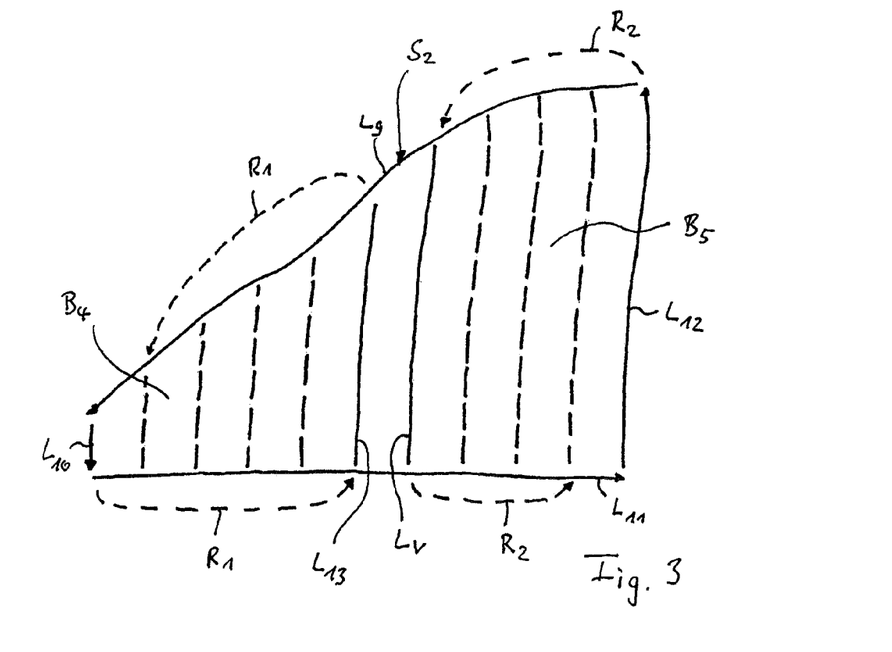
FIG. 3 shows a territory to be worked by two working machines, which is subdivided into driving paths.

An example of this is shown in FIG. 3. In this case, a field $S_2$ is worked by two machine systems, e.g., two combine harvesters (not shown), in parallel at least part of the time. To this end, the first machine system is driven along the upper edge of the field and "cuts off" the turnaround area at the upper edge of the field. At the same time, the upper contour of field $S_2$ is recorded as reference line $L_9$. Second machine system is simultaneously driven along the lower edge of field $S_2$ in FIG. 3 and "cuts off" the turnaround area there, while also recording lower reference line $L_{11}$. Each of the combine harvesters then transmits reference line $L_9$, $L_{11}$ it has determined to the other combine harvesters. On the right edge, the second combine harvester is then driven along the first track from bottom to top and records a further reference line $L_{12}$. In parallel therewith, the first combine harvester is driven along the entire, shorter track on the left edge, from top to bottom, and thereby records reference line $L_{10}$. All field edges have therefore been recorded, and the route planning devices can plan the optimal routes for the combine harvesters in a coordinated manner. To this end, in the exemplary embodiment shown, field $S_2$ is subdivided again into two beds $B_4$, $B_5$, since this is the optimal working strategy in this case. The two combine harvesters then determine their subroutes largely independently, but they utilize and take into account the planning data from the other combine harvester.

Once the beds are subdivided, the first combine harvester can begin planning and driving its route while the second combine harvester is still driving along the longer, right-hand edge of the field. The portion of reference line $L_{12}$ that has already been determined can always be transmitted in real time to the first combine harvester and incorporated into the planning. The second combine harvester first drives along its route $R_4$ to approximately the middle region of field $S_2$, along which field $S_2$ is to be subdivided into two beds $B_4$, $B_5$. It then "cuts off" a center track and records a further reference line $L_{13}$. This reference line $L_{13}$ is then shifted to the right by one cutting width, thereby resulting in a further reference line $L_V$, which is suited as a virtual guidance line for second combine harvester to use to work at the boundary of beds $B_4$, $B_5$. The second combine harvester can then carry out its route planning accordingly and drive—directly from the right edge of the field—along route R2 to a track that corresponds to derived reference line $L_V$, so that, after it has worked this track, it can continue to travel along optimal route $R_2$ it has planned.

Figure 4:
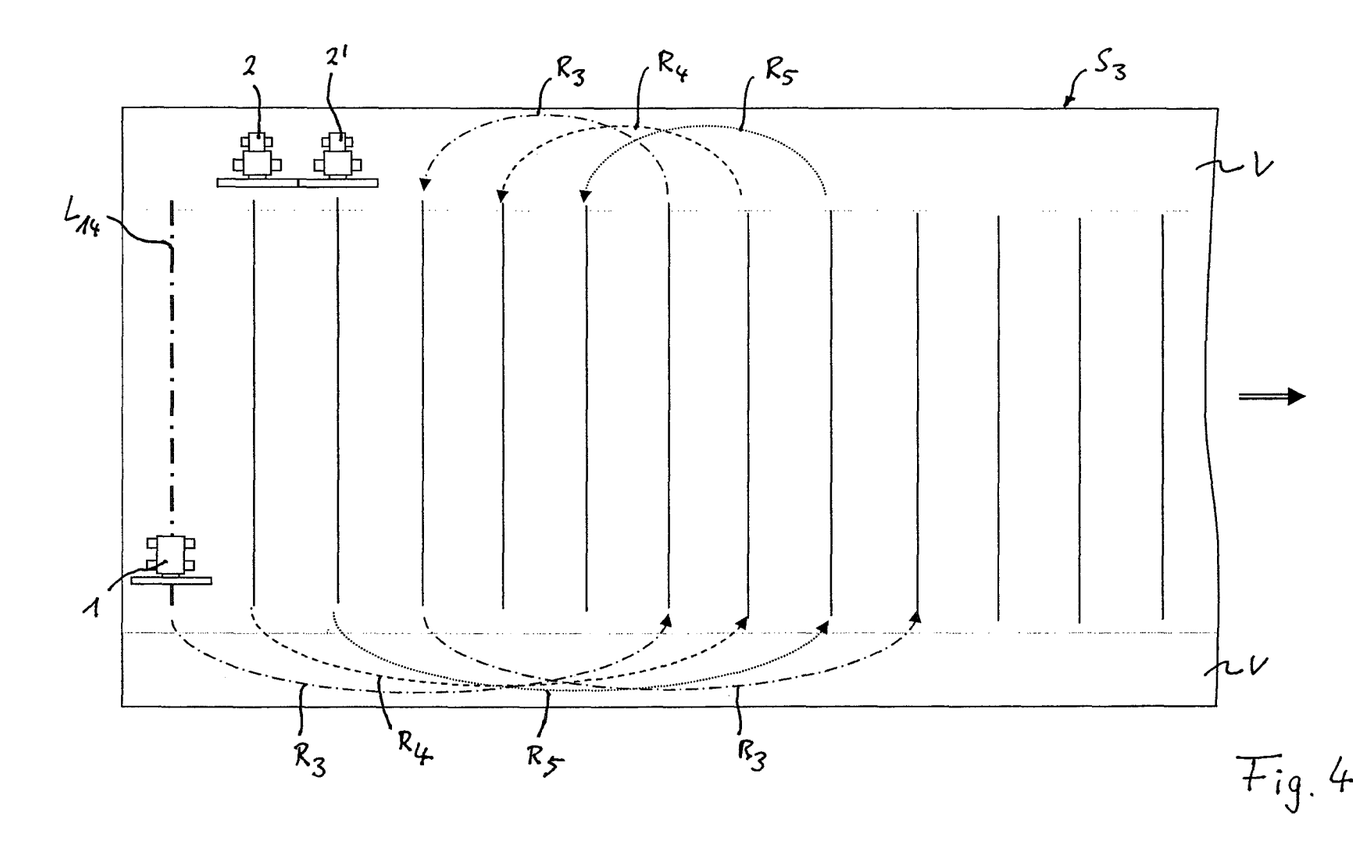
FIG. 4 shows a territory to be worked according to a route plan by a team of machines composed of three machine systems, according to a first exemplary embodiment.

FIG. 4 depicts a first variant of the possible use of the inventive control system on a relatively large, rectangular field $S_3$ that is being worked with three combine harvesters 1, 2, 2' working in parallel as a group. Combine harvesters 1, 2, 2' and their control devices can be designed as shown in FIG. 1. Since field $S_3$ is rectangular, it is sufficient when first combine harvester 1 first drives along a first edge—the left edge of field $S_3$ in this case—and thereby generates reference line $L_{14}$. Combine harvester 1 then transmits reference line $L_{14}$ to further combine harvesters 2, 2' in the group. Additional information is also transmitted, e.g., in this case, the working width of all combine harvesters working in the group, and then according to a common working strategy in which each combine harvester harvests only every third track. As a result, it is possible for each of the individual combine harvesters 1, 2, 2' to calculate optimal routes $R_3$, $R_4$, $R_5$ and to then be controlled according to these displayed routes $R_3$, $R_4$, $R_5$. In this manner, it is possible to work large field areas very quickly, and, due to the strategic selection of the tracks, it is not necessary for individual combine harvesters 1, 2, 2' to perform long turnaround maneuvers and change driving direction. Instead, they can immediately enter the next track they are scheduled to harvest. Since individual combine harvesters 1, 2, 2' and/or their route planning systems advantageously exchange data with each other continually and, in particular, transmit their own position to the other combine harvesters, the route planning can be carried out with the objective of avoiding collisions or waiting periods to avoid collisions, which can occur in turnaround areas V in particular.

Figure 5:
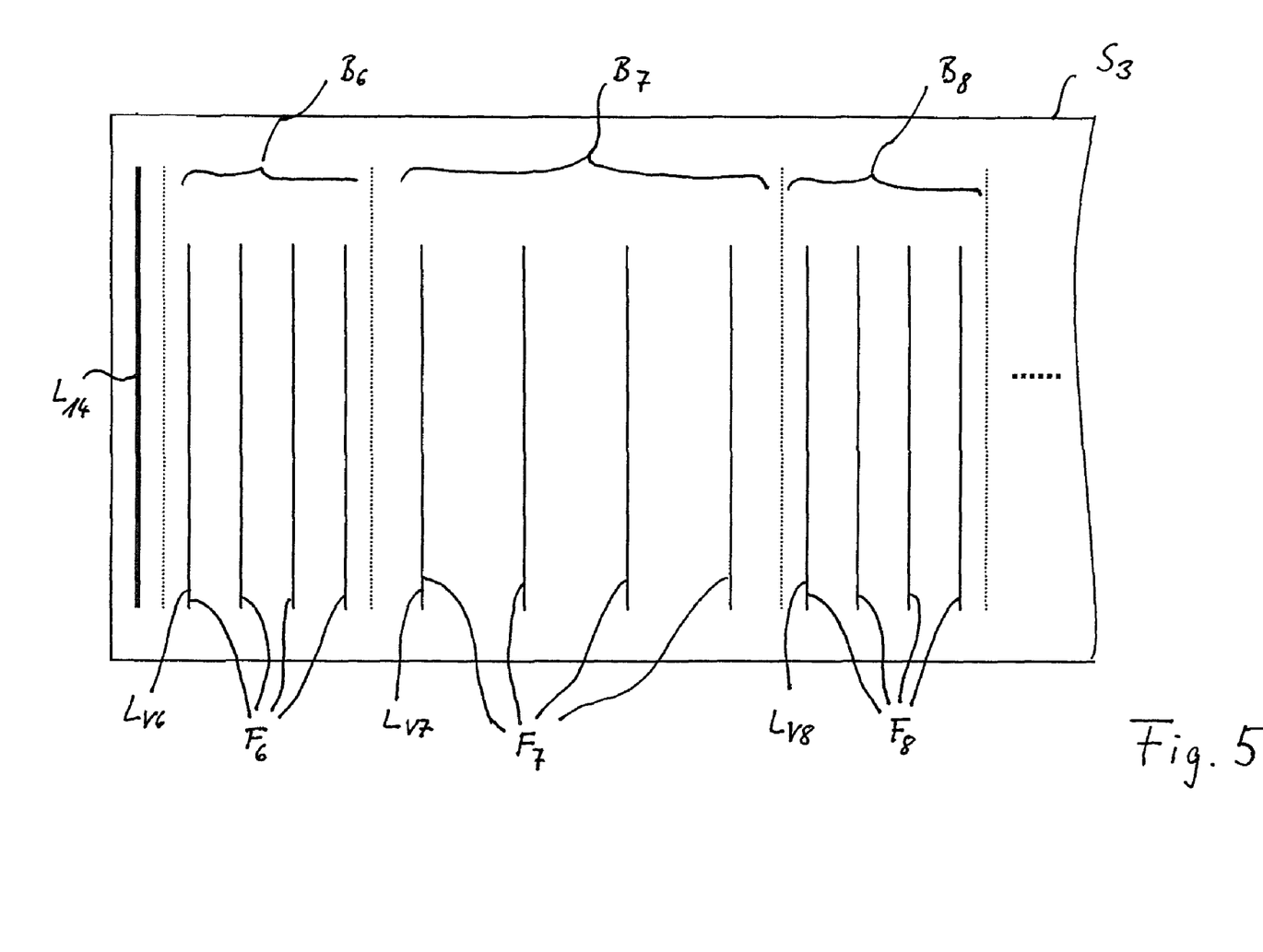
FIG. 5 shows the territory in FIG. 4, which is to be worked according to a route plan by a team of machines composed of three machine systems, according to a second exemplary embodiment.

FIG. 5 shows the same field $S_3$, which, in this case, is being worked jointly by three machine systems using a different working strategy. In this case as well, the initial step is drive the first machine system around the entire right-hand edge of the field and create first reference line $L_{14}$. In this case, however, three machine systems with different working widths will be used. Field $S_3$ is therefore subdivided in a strategic manner into beds $B_6$, $B_7$, $B_8$, while taking into account which bed $B_6$, $B_7$, $B_8$ will be worked by which machine system with which working width. The bed sizes are selected such that each machine system requires exactly four driving tracks $F_6$, $F_7$, $F_8$ to work particular bed $B_6$, $B_7$, $B_8$. Different bed widths therefore result due to the different track widths.

The subdivision of bed $S_3$ into various beds $B_6$, $B_7$, $B_8$ can be carried out, e.g., by the first machine system, which also records reference line $L_{14}$. To this end, it must be first notified of the working widths of the other machine systems. The route planning device of the first machine system then derives—e.g., based on first reference line $L_{14}$ recorded—virtual reference lines $L_{V6}$, $L_{V7}$, $L_{V8}$ for individual beds $B_6$, $B_7$, $B_8$. These are then transmitted, along with the information about the bed width, to the machine systems provided to work particular bed $B_6$, $B_7$, $B_8$. Based on reference lines $L_{V6}$, $L_{V7}$, $L_{V8}$, the individual machine systems can then determine, on their own, further driving tracks $F_6$, $F_7$, $F_8$ within particular bed $B_6$, $B_7$, $B_8$ they are to work, and they can select an optimal route, with consideration for their own machine parameters. The optimal routes are then transmitted back to the first machine systems, which functions as a "master machine system" in this case and checks to determine whether collisions are prevented in the boundary regions between beds $B_6$, $B_7$, $B_8$. It is therefore ensured, e.g., that the routes are selected such that the machine system working in bed $B_1$ does not work last driving track $F_6$ adjacent to bed $B_2$ until first driving track $F_7$ of second bed $B_7$ bordering bed $B_6$ has been harvested.

The exemplary embodiments shown in FIGS. 3 through 5 are only relatively small field sections, of course, and serve merely to illustrate basic possibilities for working fields. In reality, the territories will be much larger and will include a large number of driving tracks when the aim is to work the field using a group of several machine systems that operate in parallel. Based on the examples, however, the advantages offered by the inventive method of coordinated route planning become apparent quickly.

Figure 6:
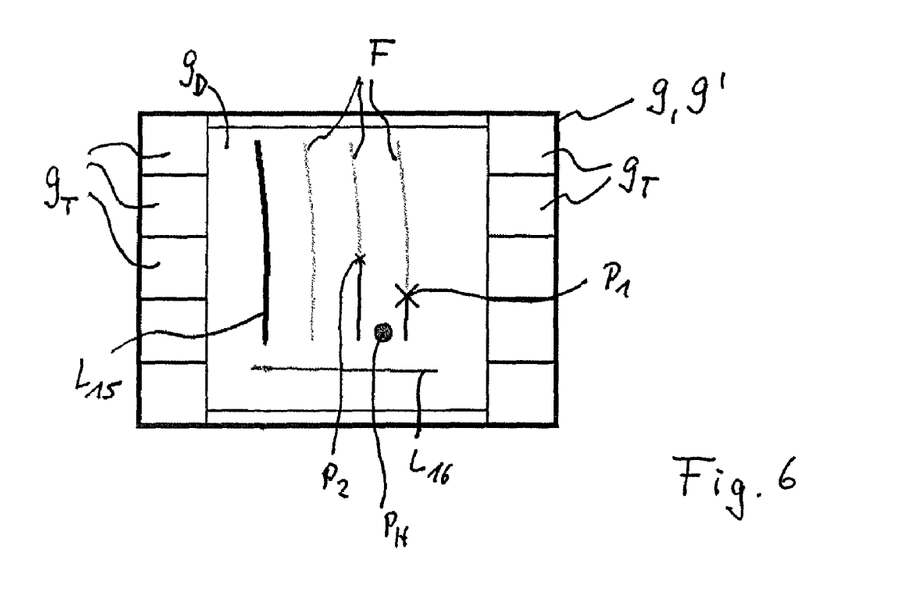
FIG. 6 shows a display device 9 with a field map displayed thereon.

FIG. 6 shows—in greater detail—a display device 9, 9' with a display surface $9_D$ and buttons $9_T$ located on the edge for use by a drive to operate control device 10, 10'. Various reference lines are displayed on display surface $9_D$, i.e., a reference line $L_{15}$ for defining driving tracks F and a reference line $L_{16}$ for the turnaround region in this case. In addition, positions $P_H$ of identified obstacles, e.g., straw bales, electrical towers, trees or the like, position $P_1$ of the vehicle, and position $P_2$ of another machine system that is driving, e.g., along a parallel driving track, can be displayed. This is a "shared display" that is made available to all drivers in the participating machine systems, thereby ensuring that they all receive all of the information about their own machine system and the other machine systems. In particular, the region of the driving tracks that have already been worked and which have yet to be worked can be depicted in the display using different display properties of the driving tracks. In addition to driving tracks F, as shown here, it is also possible, of course, to display entire routes, including the portions of the routes in the turnaround regions. This means that not only are the driving tracks and the positions of the particular machine system and the other machine systems displayed, but also which of the driving tracks have yet to be worked by the particular machine systems, and how the machine systems switch driving tracks in the turnaround regions.

Using buttons $9_T$, the driver can also select the display mode and switch, e.g., from automatic driving operation to manual operation. During manual operation, a virtual guidance line and a symbol for the position of machine system 1, 2 the driver is operating are displayed to the driver on display $9_D$. If the machine system deviates from the route to be driven, this is indicated in the display as the symbol deviating from the virtual guidance line. Using a guidance tool of this type, the driver can steer the vehicle manually relatively exactly along the desired route.

Figure 7:
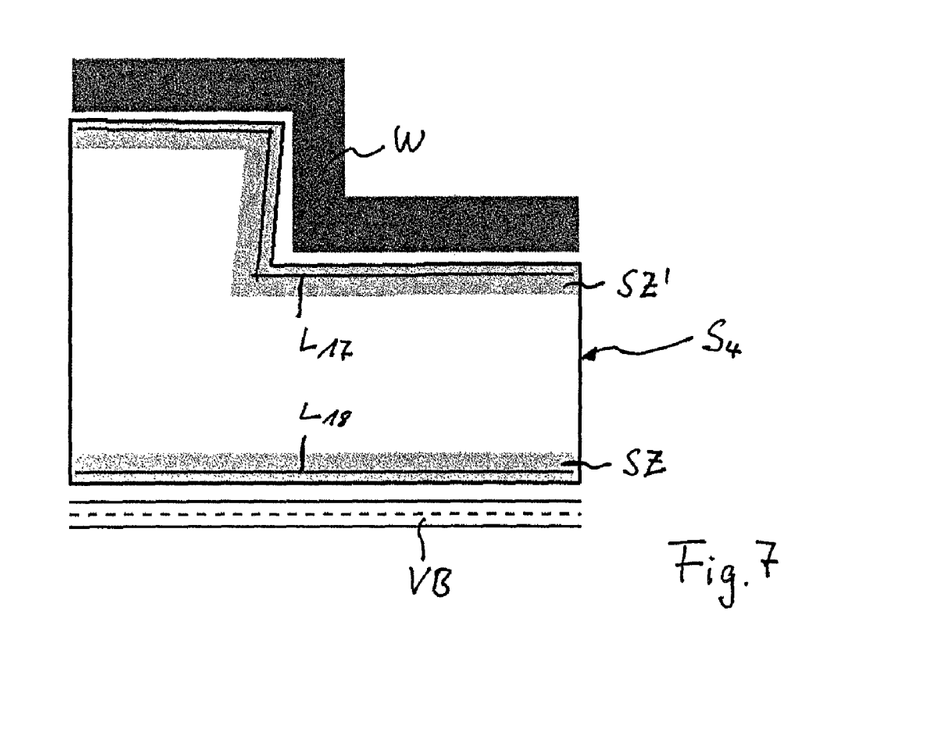
FIG. 7 shows a territory with safety regions drawn on it.

As mentioned above, certain safety zones that are assigned to the various machine systems can also be defined as part of the route planning. An example of this is shown in FIG. 7. It shows a field $S_4$ that borders a public transportation region VB—a street in this case—at the lower edge in the figure. This street poses a high risk to safety due to passing vehicles, i.e., particular attention must be paid in this region to ensuring that no parts of a machine system extend into traffic region VB. Using a reference line $L_{18}$ that extends along traffic region VB and that was recorded at the beginning of the operation, a safety zone SZ is defined for each machine system that depends in particular on certain working parameters, e.g., the turnaround radius and the working width of the machine system. The safety zone SZ is then assigned to the particular machine system. Within this safety zone SZ, for example, automatic control of the particular machine system can be limited or shut off entirely. Another safety zone SZ' is located at upper—in FIG. 7—edge of field $S_4$. Here, field $S_4$ borders a wooded region W. Due to the woods, it is not certain whether the satellite signals required to determine position can be received. For this reason, using reference line $L_{17}$, which extends along the upper edge of the field, a further safety zone SZ' for the particular machine systems is defined and assigned to the machine systems.

Figure 8:
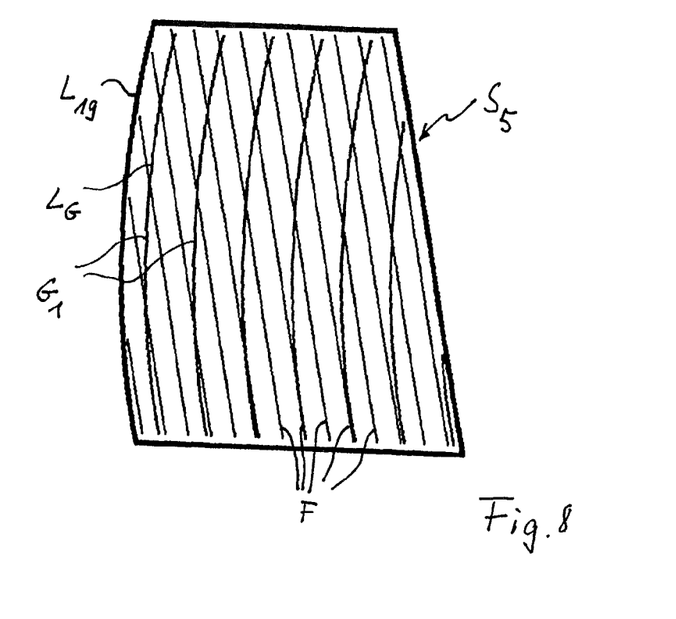
FIG. 8 shows a territory with driving tracks created based on reference lines for sowing, and additionally defined spraying paths, according to a first exemplary embodiment.
Figure 9:
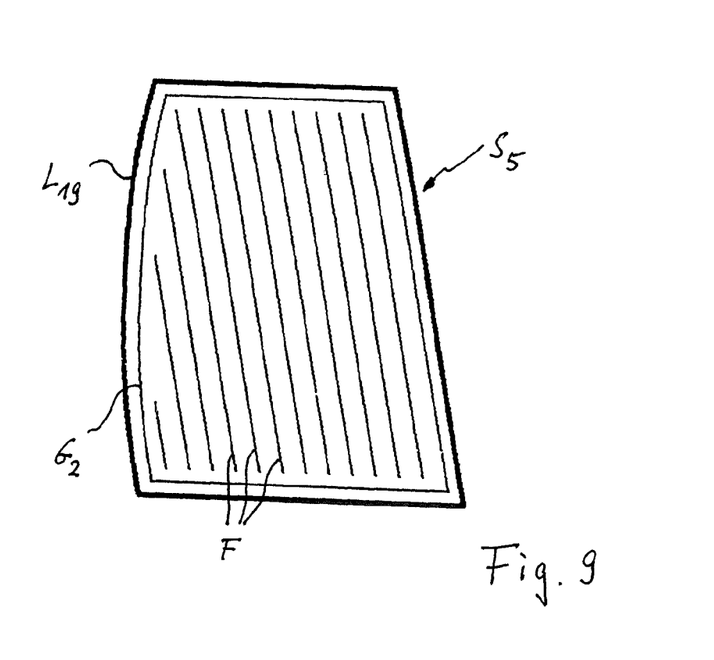
FIG. 9 shows a territory with driving tracks created based on reference lines for sowing, and additionally defined spraying paths, according to a second exemplary embodiment.

In FIGS. 8 and 9, it is shown, for example, how reference lines can be used to create a grid for paths $G_1$, $G_2$, spraying paths in particular, which can then be used to control path circuits or sub-width circuits. In both variants, different driving tracks F and paths $G_1$, $G_2$, e.g., for sowing particular field $S_5$ and for subsequent working processes to apply sprayed substances and fertilizer, are defined. To do this, a reference line $L_{19}$ is first determined that corresponds to the entire contour of field $S_5$. Driving tracks F that are parallel to the right edge of the field are then calculated for the sowing operation; these driving tracks can be separated by a distance equal to the working width of the sowing machine.

According to the variant depicted in FIG. 8, a displaced reference line $L_G$ is determined along the left-hand, outwardly arched edge of the field, which is used to generate paths (spraying paths) $G_1$ for the field sprayer to follow. The distance between these spraying paths $G_1$ is selected based on the working width of the field sprayer. These spraying paths $G_1$ intersect driving tracks F of the sowing machine at different points. The machine system can therefore take the planned spraying paths $G_1$ into account during the sowing operation itself, and, via automatic control by the driving path circuit, it can ensure sowing does not take place in the region of spraying paths $G_1$.

FIG. 9 shows an alternative, with which field $S_5$ is surrounded by a spraying path $G_2$. In the case of smaller fields $S_5$, this method is best suited when field sprayers and inorganic fertilizer sprayers are to follow.

Finally, it is pointed out once more that the machine systems and control systems shown in the figures, and the specific methods explained in context therewith are merely exemplary embodiments and they could be modified in a variety of ways by one skilled in the art, without leaving the framework of the present invention. In interest of completeness, it is also pointed out that the use of the indefinite article "a" does not preclude the fact that the particular feature can also occur in plurality.

It will be understood that each of the elements described above, or two or more together, may also find a useful application in other types of methods and constructions differing from the type described above.

While the invention has been illustrated and described as embodied in a method for creating a route plan for agricultural machine, systes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for creating a shared route plan for a group of agricultural working machine systems for working a territory, comprising the steps of:
    including with each of the machine systems route planning data determination devices for determining sub-route plans for sub-areas associated with each of the machine systems;
    establishing one of the agricultural working machine systems to operate as a master machine system at any time by operators of the group of agricultural working machines or by an operator of the group of agricultural working machines with special authorization;
    generating, by a central route planning device on the master machine system, a set of reference lines from reference lines, which reference lines are determined by each of the individual machine systems;
    exchanging data comprising the sub-route plans, including the reference line portion of the set of reference lines, by the route planning data determination devices with each other and with the master machine system; and
    based on exchanged route planning data, including the sub-route plans and the set of reference lines, the central route planning device on the master machine creating a master shared route plan for the territory, which master shared route plan includes assignment of sub-regions to be worked and sub-tasks to be carried out by the machine systems with consideration for the machine system parameters to determine the extent to which the sub-routes are well coordinated with each other and to specify conditions for the machine systems to comply with; and
    using the created master shared route plan by all the machine systems for working the territory in a coordinated manner, wherein route planning data determination devices within the machine systems optimize, relative freely, respective optimal route plans in respective sub-areas without regard for other machine systems except for in driving tracks where the sub-areas border each other.

2. A method as defined in claim 1; and further comprising including in the route planning data geographic reference data that are determined with the machine systems.

3. A method as defined in claim 1; and further comprising subdividing the territory into subregions based on the route planning data.

4. A method as defined in claim 3; and further comprising determining by each of the machine systems a subroute plan for a certain subregion of the territory.

5. A method as defined in claim 1; and further comprising working the territory by the machine systems in chronological succession.

6. A method as defined in claim 1; and further comprising working the territory by the machine systems in parallel, at least part of the time.

7. A method as defined in claim 1; and further comprising changing the shared route plan dynamically in a situation selected from the group consisting of a situation when a new machine system is added to a group and a situation when a machine system leaves the group.

8. A method as defined in claim 1; and further comprising determining current position data of an individual one of the machine systems repeatedly and sending to another one of the machine systems.

9. A method as defined in claim 1; and further comprising outputting to operators of the machine systems using a display device, a map created based on a geographical reference data, a current position and an optimal route for a particular one of the machine systems, and a current position of another machine system in a group located in the territory to be worked.

10. A method as defined in claim 9; and further comprising displaying to the operator of the machine system routes of other machine systems in the group that are located in the territory to be worked.

11. A method as defined in claim 1; and further comprising, when a group of agricultural working machine systems works the territory, including in the route plan optimized routes assigned to individual ones of the machine systems for working the territory; and driving the machine systems along a particular route assigned to them.

12. A route planning system for creating a route plan for a group of agricultural working machine systems for working a territory, comprising:
    position determination devices located on the agricultural machine systems for determining a current position of a particular one of the machine systems;
    route planning data determination devices located on the machine systems for determining sub-route plans for sub-areas associated with each of the machine systems;
    communication devices located on the machine systems for transmitting and exchanging the sub-route plans generated by the route planning data determination devices located on the machine systems; and
    at least one machine system including a central route planning device which is coupled with a receiving unit and which is established to operate as a master machine system at any time by operators of the group of agricultural working machines or by an operator of the group of agricultural working machines with special authorization,
    wherein said master machine system receives the sub-route plans from the machine systems, with which received sub-route plans said central route planning device creates one master shared route plan for a particular territory,
    wherein said created master shared route plan includes assignment of sub-regions to be worked and sub-tasks to be carried out by the machine systems with consideration for the machine system parameters to determine the extent to which the sub-routes are well coordinated with each other and to specify conditions for the machine systems to comply with, and
    wherein said created master shared route plan is used by all machine systems for working the territory in a coordinated manner during which the route planning data determination devices in the machine systems optimize, relatively freely, respective optimal route plans in respective sub-areas without regard for other machines systems except for in driving tracks where the sub-areas border each other.

* * * * *